United States Patent [19]
Nakai

[11] Patent Number: 5,748,591
[45] Date of Patent: May 5, 1998

[54] DISK DRIVE

[75] Inventor: Hidekazu Nakai, Kanagawa, Japan

[73] Assignee: Sony Corporation, Tokyo, Japan

[21] Appl. No.: 736,569

[22] Filed: Oct. 24, 1996

[30] Foreign Application Priority Data

Oct. 30, 1995 [JP] Japan .................. 7-282120

[51] Int. Cl.⁶ .................................................. G11B 3/90
[52] U.S. Cl. ................................... 369/58; 369/190
[58] Field of Search ........................... 369/58, 54, 49, 369/48, 190, 239, 240

[56] References Cited

U.S. PATENT DOCUMENTS

| | | | |
|---|---|---|---|
| 4,302,833 | 11/1981 | Tanaka et al. | 369/239 |
| 4,653,040 | 3/1987 | Senso | 369/239 |
| 4,773,052 | 9/1988 | Sugiura et al. | 369/190 |
| 5,042,025 | 8/1991 | Aoyagi et al. | 369/190 |
| 5,172,354 | 12/1992 | Otsubo | 369/58 |
| 5,508,987 | 4/1996 | Matsunaga et al. | 369/58 |

*Primary Examiner*—Tan Dinh
*Attorney, Agent, or Firm*—Limbach & Limbach L.L.P.

[57] ABSTRACT

A disk drive capable of determining the diameter of the currently loaded disk in a short time without the use of additional attachments such as optical sensors. Servo gains are first set to permit rotation of a 12-cm CD, and the servo is turned on. The CD is rotated at a steady rotational speed regardless of its diameter. The servo is turned off when a sub-code synchronizing signal is detected from the CD. Acceleration pulses are generated to start accelerating the spindle motor simultaneously with the starting of a timer. The timer is stopped when the next sub-code synchronizing signal is detected, and the servo is again turned on. If the value on the timer is longer than a reference time, the loaded CD is found to be a 12-cm CD and the appropriate servo gains are set for the 12-cm CD; if the timer value is shorter than the reference time, the CD is found to be an 8-cm CD and the servo gains are set accordingly.

13 Claims, 3 Drawing Sheets

DISK DRIVE

BACKGROUND OF THE INVENTION

1. Field of the Invention

The present invention relates to a disk drive capable of reproducing data from disks of different diameters. More particularly, the invention relates to a disk drive capable of determining the diameter of the currently loaded disk in a short time without the use of additional attachments such as an optical sensor, the disk diameter being determined on the basis of the intervals at which a periodical signal is detected from signals reproduced from the disk when the spindle motor of the drive is accelerated starting from the state where the disk is rotated steadily at a predetermined rotational speed.

2. Description of the Related Art

The CD (compact disk) comes in two diameters: 8 and 12 centimeters. If the two types of CD are made of the same material, their masses obviously differ depending on the diameter. Upon reproduction of data from CD's of different masses, preventing sound quality from getting adversely affected by the mass difference requires that the gains of the spindle servo (i.e, CD rotation control device) of the disk drive be set to optimum values relevant to the disk diameter in effect. This in turn requires determining the diameter of every disk that is loaded for data reproduction therefrom.

A conventional method for determining the disk diameter typically involves the use of an optical sensor comprising a light emitting element and a light receiving element so positioned as to face the CD from both sides. More specifically, the optical sensor is furnished so that when a CD with a diameter of 8 cm (hereinafter called the 8-cm CD) is loaded, the light receiving element can receive light coming from the light emitting element, and that when a CD having a diameter of 12 cm (called the 12-cm CD) is loaded, the light receiving element cannot receive light from the light emitting element. A built-in microcomputer recognizes the presence of the 12-cm CD if the light receiving element cannot receive light from the light emitting element; the 8-cm CD is recognized if the light receiving element can receive light from the light emitting element. Although the absence of any CD also lets the light receiving element receive light from the light emitting element, confusion is avoided by use of other means for verifying that no CD is currently loaded.

One disadvantage of the conventional setup above is that installing the optical sensor for disk diameter determination increases the number of component parts in the disk drive and pushes up its production cost. Another disadvantage is that securing a space in which to install the optical sensor requires the disk drive (e.g., CD player, CD-ROM drive) to be larger in size while placing constraints on the layout of the other component parts therein.

OBJECT AND SUMMARY OF THE INVENTION

It is therefore an object of the present invention to provide a disk drive capable of determining the diameter of the currently loaded disk in a short time without the use of additional attachments such as the optical sensor.

In carrying out the invention and according to one aspect thereof, there is provided a disk drive capable of reproducing data from any one of disks having different diameters, the disk drive comprising: periodical signal detection means for detecting a periodical signal included in signals reproduced from the disk; spindle servo means for controlling a spindle motor rotating the disk so that the periodical signal will appear at constant intervals in the signals reproduced from the disk; acceleration means for accelerating the spindle motor for a predetermined time starting from a first point in time at which the periodical signal detection means detects the periodical signal appearing at substantially constant intervals in the signals reproduced from the disk rotated at a predetermined rotational speed; time measurement means for measuring the time ranging from the first point in time to a second point in time at which the periodical signal detection means detects the periodical signal a second time; and disk diameter determination means for determining the diameter of the disk by comparing the time measured by the time measurement means with a reference time.

In operation, as outlined above, the spindle servo means controls the spindle motor rotating the disk so that the periodical signal will appear at constant intervals in the signals reproduced from the disk. Then the acceleration means accelerates the spindle motor for the predetermined time starting from the first point in time at which the periodical signal detection means detects the periodical signal appearing at substantially constant intervals in the signals reproduced from the disk rotated at the predetermined rotational speed. Illustratively, with the servo turned off, the spindle motor is supplied with kick pulses (acceleration pulses) as a drive signal. The time measurement means measures the time ranging from the first point in time to the second point in time at which the periodical signal detection means detects the periodical signal a second time. When the disk diameter is found to be large, the greater disk weight causes the measured time to be longer than the reference time; when the disk diameter is small, the measured time becomes shorter than the reference time because of the less disk weight. The disk diameter determination means determines the diameter of the disk by comparing the time measured by the time measurement means with the reference time. The servo gain setting means sets the servo gains of the spindle servo means on the basis of the result of the determination performed by the disk diameter determination means. Illustratively, a high servo gain is set when the diameter of the disk is found to be large and a low servo gain is established when the disk diameter is small.

Further objects and advantages of this invention will become apparent from a consideration of the drawings and ensuing description of it.

DESCRIPTION OF THE PREFERRED EMBODIMENT

Figure 1:
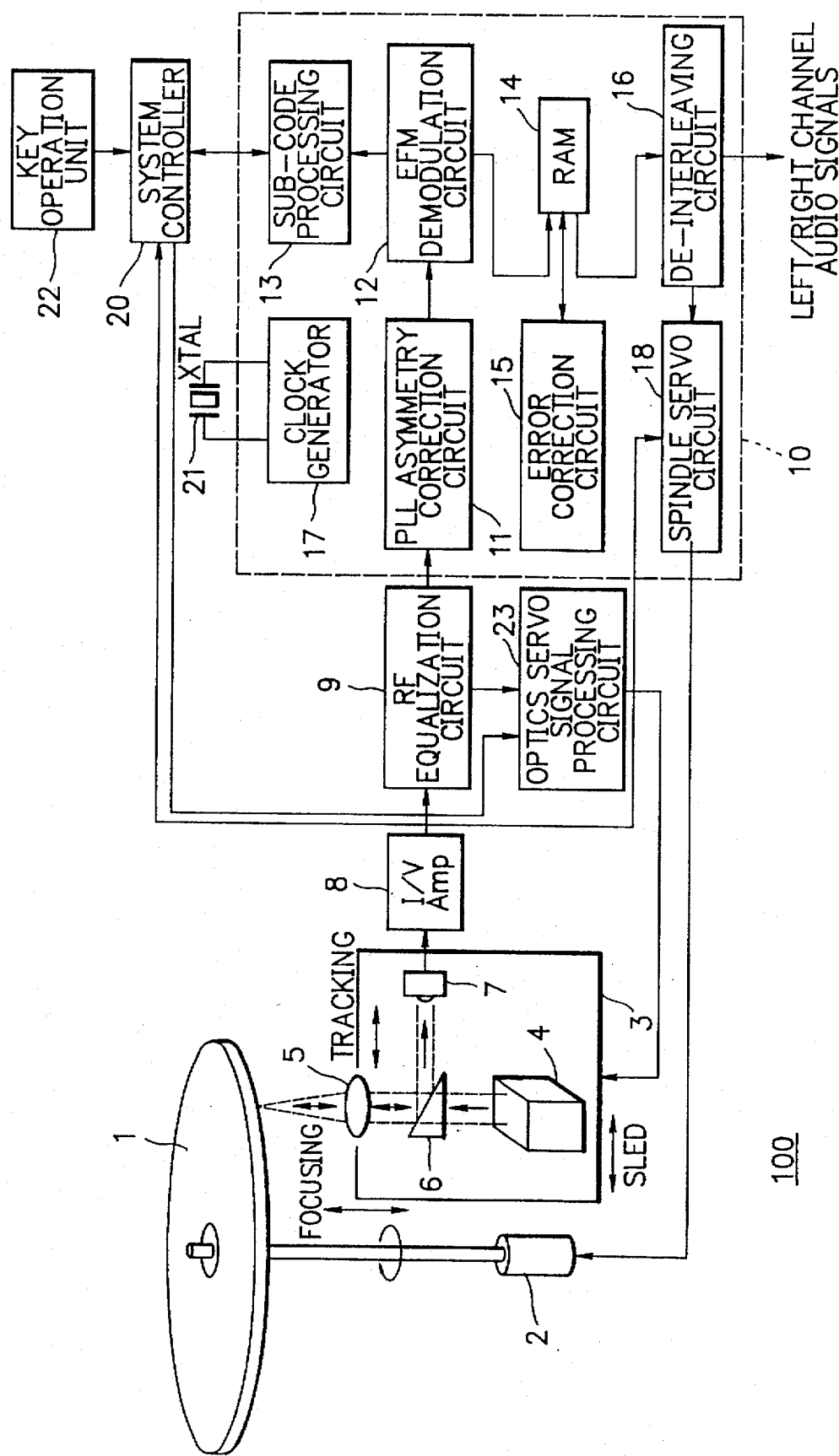
FIG. 1 is a block diagram of a compact disk (CD) player practiced as an embodiment of the invention.

One embodiment of the present invention will now be described with reference to the accompanying drawings. FIG. 1 illustrates the overall constitution of a CD player 100 embodying the invention.

The CD player 100 has a spindle motor 2 for rotating a CD (compact disk) 1 at a constant linear velocity (CLV) and an optical pickup 3 for reading data recorded on the CD 1. The optical pickup 3 comprises a laser diode 4, an objective lens 5 that focuses a laser beam from the laser diode 4 as a data reading light spot onto the recording surface of the CD 1, a deflecting beam splitter 6 that directionally deflects the reflected light from the recording surface of the CD 1, and a photo detector 7 that receives the reflected light beam. The optical pickup 3 is movably installed in the radial direction of the disk, driven by a sled feed motor (not shown).

The optical pickup 3 also incorporates a tracking actuator and a focus actuator, not shown. The tracking actuator radially displaces the data reading light spot with respect to the recording tracks on the CD 1. The focus actuator moves the objective lens 5 in the optical axis direction.

The CD player 100 comprises a current-voltage (I/V) converting amplifier 8, an RF equalization circuit 9 and a digital signal processor 10. The current-voltage converting amplifier 8 converts to a voltage signal the current signal output by the photo detector 7 in the optical pickup 3. The RF equalization circuit 9 rectifies in waveform a reproduced RF signal output by the current-voltage converting amplifier 8. The digital signal processor 10 (called the DSP circuit hereunder) processes the reproduced RF signal waveform-rectified by the RF equalization circuit 9, thereby obtaining an audio signal.

The DSP circuit 10 has a PLL, asymmetry correction circuit 11 and an EFM (eight-to-fourteen modulation) demodulation circuit 12. The PLL asymmetry correction circuit 11 subjects the reproduced RF signal to asymmetry correction. The EFM demodulation circuit 12 demodulates the reproduced RF signal (EFM signal) corrected in asymmetry by the PLL asymmetry circuit 11, thereby acquiring digital audio data or sub-code data supplemented by parity data for error correction and detection. Furthermore, the EFM demodulation circuit 12 detects a sub-code synchronizing signal from $S_0$ and $S_1$ synchronizing patterns in synchronism with the so-called 98 frame scheme, i.e., sub-coding frame scheme. "Asymmetry" is a state in which the center of the eye pattern of the reproduced RF signal is dislodged from the amplitude center. The PLL asymmetry correction circuit 11 incorporates a PLL circuit that generates a reproduced clock signal PLLCK based on binary signal edges.

The DSP circuit further includes a sub-code processing circuit 13, a RAM (random access memory) 14, an error correction circuit 15 and a de-interleaving circuit 16. The sub-code processing circuit 13 synchronizes the sub-code data from the EFM demodulation circuit 12 with the sub-code synchronizing signal, thereby obtaining illustratively from a sub-code Q channel the data indicating the numbers of movements making up a piece of music, data representing absolute playing time (in minutes, seconds, frames), and data denoting the elapsed time of each of the movements (in minutes, seconds, frames) The RAM 14 temporarily accommodates digital audio data output by the EFM demodulation circuit. The error correction circuit 15 subjects the digital audio data in the RAM 14 to an error correction process based on the parity data for error correction and detection. The de-interleaving circuit 16 de-interleaves the CIRC (cross interleave reed-solomon code) of the digital audio data corrected by the error correction circuit 15, thereby acquiring audio signals over the left channel (Lch) and right channel (Rch).

In addition, the DSP circuit 10 comprises a clock generator 17 and a spindle servo circuit 18. The clock generator 17 generates various clock signals based on a high-precision oscillation output from a crystal oscillator 21. The spindle servo circuit 18 controls the revolutions of the spindle motor 2. The DSP circuit 10 carries out signal processing in accordance with the diverse clock signals output by the clock generator 17.

The CD player 100 also has a system controller 20 which includes a CPU (central processing unit) for controlling the system as a whole, a key operation unit 22 connected to the system controller 20 and operated by a user, and an optics servo signal processing unit 23 for controlling the optical pickup 3 in operation. The system controller 20 is supplied with various data obtained by the sub-code processing circuit 13 from the sub-code data. The sub-code synchronizing signal detected by the EFM demodulation circuit 12 is sent to the system controller 20 via the sub-code processing circuit 13.

The optics servo signal processing circuit 23 controls relative to the operation of the optical pickup 3 three servo systems: a tracking servo system for causing the data reading light spot to follow the recording tracks of the CD 1, a focusing servo system for focusing the light spot onto the recording surface of the CD 1, and a sled servo system for radially controlling the position of the optical pickup 3.

Figure 2:
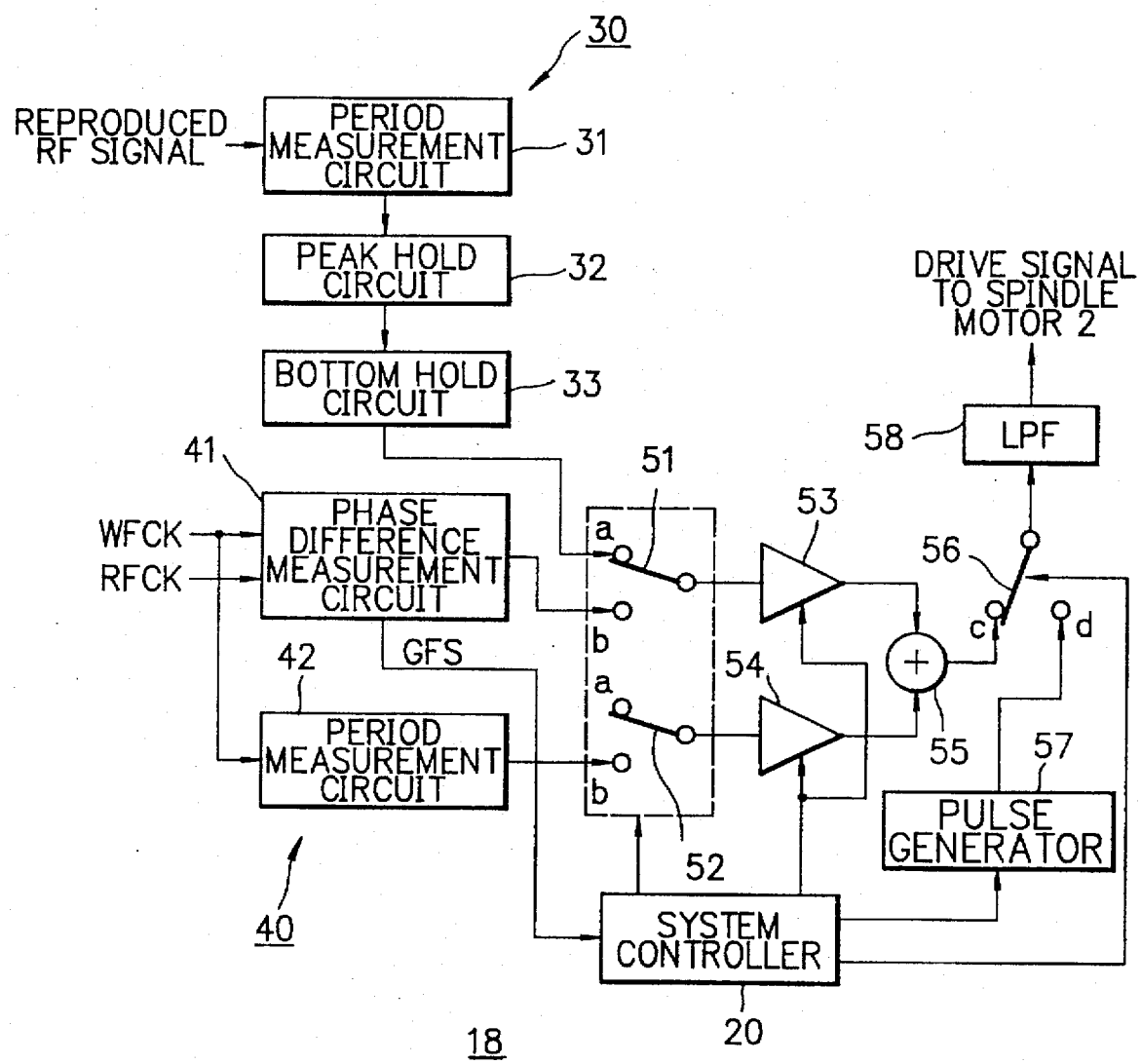
FIG. 2 is a block diagram of a typical spindle servo circuit included in the embodiment.

FIG. 2 depicts a typical constitution of the above-described spindle servo circuit 18. The spindle servo circuit 18 comprises a rough (setting) servo circuit 30 and a phase lock servo circuit 40. The rough servo circuit 30 sets the rotational speed of the spindle to a roughly precise range. The phase lock servo circuit 40 carries out more accurate speed control following the rough setting by the rough servo circuit 30.

The rough servo circuit 30 has a period measurement circuit 31, a peak hold circuit 32 and a bottom hold circuit 33. The period measurement circuit 31 measures the period corresponding to the frame synchronizing portion of the reproduced RF signal from the CD 1, i.e., to the time duration representing a maximum pit, and obtains an error signal reflecting the error of the time duration relative to a reference value. The peak hold circuit 32 holds the maximum value, within a predetermined period Ta, of the error signal coming from the period measurement circuit 31. The bottom hold circuit 33 holds the minimum value, within a predetermined period Tb (Tb>Ta), of the signal output by the peak hold circuit 32. The peak hold circuit 32 and bottom hold circuit 33 combine to eliminate the adverse effects of noise resulting from drop-outs, whereby a high-quality error signal is acquired from the bottom hold circuit 33.

The phase lock servo circuit 40 includes a phase difference measurement circuit 41 and a period measurement circuit 42. The phase difference measurement circuit 41 compares the phase of a reference clock signal RFCK with that of a reproduced clock signal WFCK whose single period corresponds to the period of the frame synchronizing signal in the reproduced RF signal, whereby a phase difference signal is output. The period measurement circuit 42, constituting a speed servo loop, measures the period of the reproduced clock signal WFCK above and obtains a speed error signal representing the error of the measured period with respect to a reference value. When the phase of the reproduced clock signal WFCK approaches that of the reference clock signal RFCK, the PLL making up the phase difference measurement circuit 41 is locked. The phase difference measurement circuit 41 supplies the system controller 20 with a signal GFS (guard frame sync) indicating whether the PLL is locked. Illustratively, the signal GFS is driven Low when the PLL is not locked, and is brought High when the PLL is locked.

The spindle servo circuit 18 has two changeover switches 51 and 52. The changeover switch 51 selectively extracts either the error signal from the bottom hold circuit 33 making up part of the rough servo circuit 30, or the phase error signal from the phase difference measurement circuit 41 constituting part of the phase lock servo circuit 40. The changeover switch 52 selectively extracts the speed error signal from the period measurement circuit 42 forming part of the phase lock servo circuit 40.

The fixed terminal on the a side of the changeover switch 51 is fed with the error signal from the bottom hold circuit 33, and the fixed terminal on the b side of the same switch is supplied with the phase error signal from the phase difference measurement circuit 41. The fixed terminal on the a side of the changeover switch 52 is electrically floated, and the fixed terminal on the b side of the switch 52 is fed with the speed error signal from the period measurement circuit 42. The operations of the changeover switches 51 and 52 are controlled by the system controller 20. Upon rough speed setting, the terminals are set to the a side each to let the rough servo circuit 30 operate. Then the PLL of the phase difference measurement circuit 41 is locked and the signal GFS is brought High. The terminals are thereupon set to the b side each to let the phase lock servo circuit 40 operate.

The spindle servo circuit 18 has amplifiers 53 and 54 that amplify the output signals of the changeover switches 51 and 52 respectively and output amplified signals; an adder 55 that adds up the output signals of the amplifiers 53 and 54; a pulse generator 57 that generates kick pulses (acceleration pulses) for accelerating the spindle motor 2; a changeover switch 56 that selectively extracts either the output signal of the adder 55 or the output kick pulses of the pulse generator 57 as a drive signal; and a low-pass filter 58 that limits the bandwidth of the signal extracted by the changeover switch 56 and sends the resulting signal as a drive signal to the spindle motor 2.

The gains of the amplifiers 53 and 54 are controlled by the system controller 20. The gains are set to appropriate values depending on whether the currently loaded CD 1 is a 12-cm CD or an 8-cm CD, as will be described later. Generation of kick pulses by the pulse generator 57 is also controlled by the system controller 20. As will be described later in more detail, the system controller 20 causes the pulse generator 57 to generate kick pulses to accelerate the spindle motor 2 when determining the diameter of the CD 1. The fixed terminal on the c side of the changeover switch 56 is supplied with the output signal of the adder 55, and the fixed terminal on the d side of the same switch is fed with the kick pulses from the pulse generator 57. The operation of the changeover switch 56 is controlled by the system controller 20. With the servo turned on, the changeover switch 56 is set to the c side. When the servo is turned off to accelerate the spindle motor 2, the switch 56 is set to the d side.

With the servo in the normal turned-on state, the spindle servo circuit 18 of FIG. 2 works as follows: when the servo is turned on, the changeover switch 56 is set to the c side to form the servo loop. The changeover switches 51 and 52 are set to the a side each to enable control by the rough servo circuit 30. That is, the rough speed setting process is carried out so that the rotational speed of the spindle will approach the reference rotational speed. The rough speed setting process locks the PLL of the phase difference measurement circuit 41 allowing data to be reproduced from the CD 1. With its PLL locked, the phase difference measurement circuit 51 drives the signal GFS High before outputting the signal. This causes the changeover switches 51 and 52 to be set to the b side each to enable control by the phase lock servo circuit 40.

Figure 3:
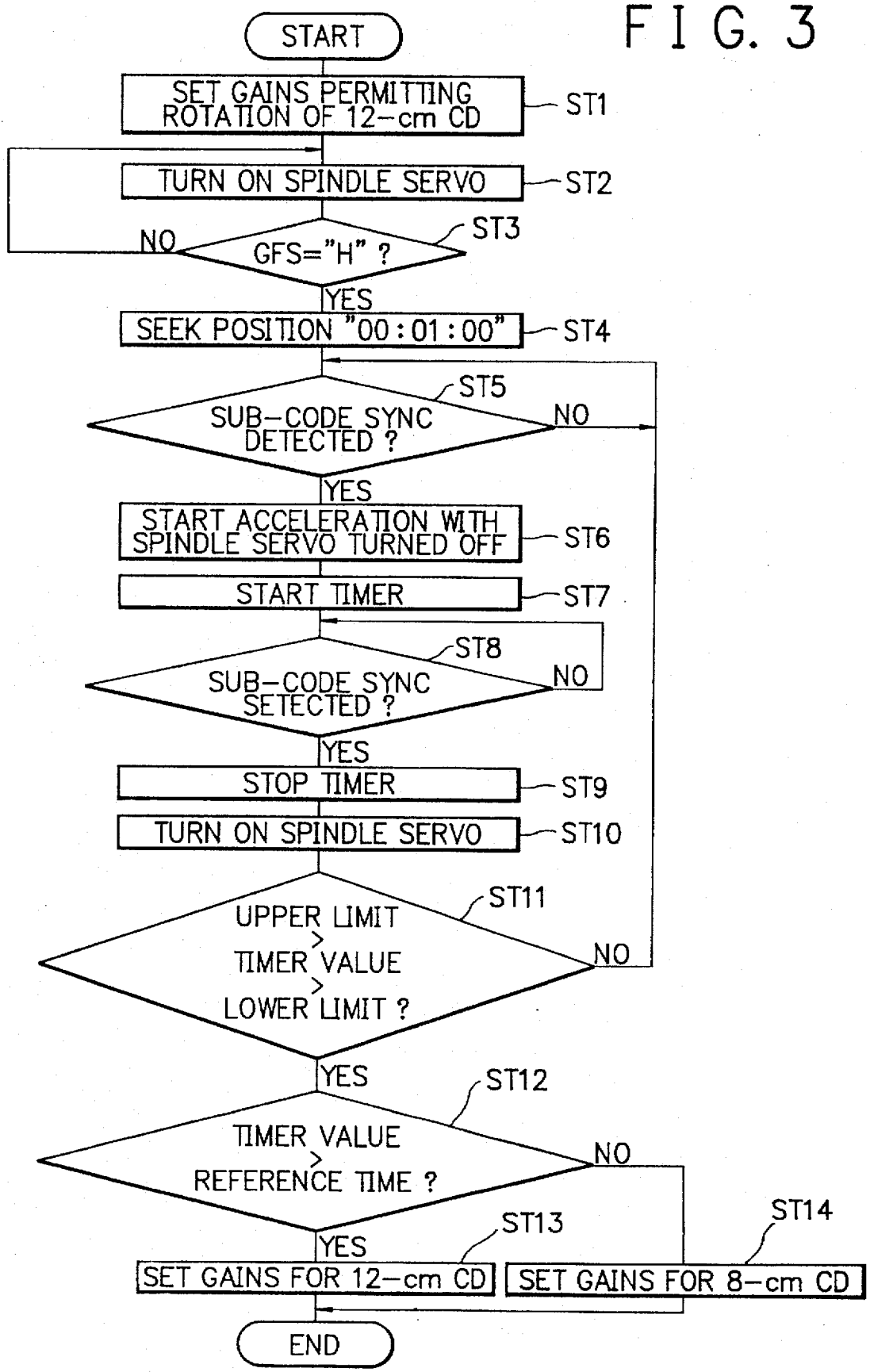
FIG. 3 is a flowchart of steps in which to determine the disk diameter and to set the servo gains in conjunction with the embodiment.

As mentioned, the gains of the amplifiers 53 and 54 in the spindle servo circuit 18 are set by the system controller 20 in accordance with the diameter of the CD 1. The system controller 20 determines the diameter of the CD 1 and sets the amplifiers' gains accordingly by following the steps constituting the flowchart of FIG. 3.

In step ST1, the amplifiers 53 and 54 are set for gains allowing at least the 12-cm CD to rotate. In step ST2, the changeover switch 56 is set to the c side to form the servo loop, and the servo is turned on. At this point, the changeover switches 51 and 52 are set to the a side each to enable control by the rough servo circuit 30. In step ST3, a check is made to see if the signal GFS from the phase difference measurement circuit 41 is High. If the signal GFS is found to be High with the PLL of the phase difference measurement circuit 41 being locked, step ST4 is reached. After the signal GFS is brought High, the changeover switches 51 and 52 are set to the b side each to enable control by the phase lock servo circuit 40.

In step ST4, the system controller 20 controls the radial position of the optical pickup 3 through the optics servo signal processing unit 23 on the basis of the data representing the absolute time (in minutes, seconds, frames) supplied from the sub-code processing circuit 13. Illustratively, the optical pickup 3 is controlled so as to seek and approach the position "00 : 01 : 00." This allows the CD 1 to rotate at a steady rotational speed regardless of its diameter, ensuring a substantially stable period (about 13.3 msec) for the sub-code synchronizing signal (synchronizing patterns $S_0$ and $S_1$ of sub-coding frames) contained in reproduced signals from the CD 1. In step ST5, a check is made to see if the EFM demodulation circuit 12 has detected any sub-code synchronizing signal based on the sub-code synchronizing signal supplied from the same EFM demodulation circuit 12. If any sub-code synchronizing signal is detected, step ST6 is reached.

In step ST6, the changeover switch 56 is set to the d side to turn off the servo. At the same time, the pulse generator 57 is allowed to generate kick pulses (acceleration pulses) that are supplied as a drive signal to the spindle motor 2 via the changeover switch 57 and low-pass filter 58, whereby acceleration of the spindle motor 2 is started. In step ST7, a built-in timer of the system controller 20 is started. The system controller 20 then proceeds to step ST8.

In step ST8, a check is made to see if the EFM demodulation circuit 12 has detected any sub-code synchronizing signal based on the sub-code synchronizing signal supplied from the same EFM demodulation circuit 12. If the synchronizing pattern is detected, step ST9 is reached in which the timer is stopped. In step ST10, the changeover switch 56 is set to the c side to again turn on the servo, whereby the above-mentioned normal servo-on operation is resumed. Generation of kick pulses by the pulse generator 57 is stopped simultaneously with or prior to the setting of the changeover switch 56 to the c side.

In step ST11, a check is made to see if the value on the timer falls within a range delimited by predetermined upper and lower limits. If the timer value is outside the predetermined range, the system controller 20 recognizes an error, returns to step ST5 and repeats the control steps therefrom. If the timer value falls within the range, step ST12 is reached. In step ST12, another check is made to see if the timer value exceeds a reference time. That reference time is set to be longer than a first timer value in effect when the CD 1 is the heaviest 8-cm CD (e.g., made of glass), and shorter than a second timer value in effect when the CD 1 is the lightest 12-cm CD (e.g., made of polycarbonate). Although varying somewhat with the torque of the spindle motor 2, the difference between the first and the second timer values is generally large enough to let the reference time be established easily.

If the timer value is found to be longer than the reference time in step ST12, the system controller 20 determines the CD 1 to be a 12-cm CD and goes to step ST13. In step ST13, the amplifiers 53 and 54 in the spindle servo circuit 18 are set for the gains relevant to the 12-cm CD. If the timer value is found to be shorter than the reference time in step ST12, the system controller 20 determines the CD 1 to be an 8-cm CD and goes to step ST14. In step ST14, the amplifiers 53 and 54 in the spindle servo circuit 18 are set for the gains applicable to the 8-cm CD.

Described below is what takes place when, with the CD 1 loaded into the CD player 100 of FIG. 1, the user pushes the playback key of the key operation unit 22. Pushing the playback key first causes the system controller 20 to determine the diameter of the CD 1 according to the steps in FIG. 3. Then with the amplifiers 53 and 54 in the spindle servo circuit 18 (FIG. 2) being set for the gains appropriate to the disk diameter, the optical pickup 3 starts reproducing data from the CD 1.

The reproduced RF signal from the RR equalization circuit 9 is sent to the EFM demodulation circuit 12 via the PLL asymmetry correction circuit 11 in the DSP circuit 10. In turn, the EFM demodulation circuit 12 outputs the digital audio data supplemented by parity data for error detection and correction. The digital audio data is held temporarily in the RAM 14 and is subjected to error correction by the error correction circuit 15 based on the parity data for error detection and correction. The corrected data is forwarded to the de-interleaving circuit 16 which de-interleaves the CIRC of the digital audio data and thereby outputs audio signals over the left channel and right channel.

The sub-code data from the EFM demodulation circuit 12 is processed by the sub-code processing circuit 13. Illustratively from the sub-code Q channel, the sub-code processing circuit 13 acquires data indicating the numbers of movements making up a piece of music, data representing absolute playing time (in minutes, seconds, frames), and data denoting the elapsed time of each of the movements (in minutes, seconds, frames). Such data are fed to the system controller 20 for display purposes (indicators are not shown) and for positioning control of the optical pickup 3.

In the CD player 100 of FIG. 1, the CD 1 regardless of its diameter is first set to a steady rotational speed so that the period of the sub-code synchronizing signal included in reproduced signals from the CD 1 remains substantially constant. In that state, the spindle motor 2 is accelerated and the resulting intervals at which the sub-code synchronizing signal is detected are used as the basis for determining the disk diameter. This scheme allows the disk diameter to be determined in a short time. One benefit of this scheme is that the time required from the time the playback key of the key operation unit 22 is pushed up to the reproduced sound output is shortened. Another benefit is a spindle servo operation at enhanced levels of responsiveness and stability, made possible by the fact that the spindle motor revolutions are controlled by the spindle servo circuit 18 having the amplifiers 53 and 54 set for the optimum gains relevant to the disk diameter determined. Furthermore, the absence of conventional attachments such as optical sensors to detect the diameter of the CD 1 contributes to resolving various space-related problems and constraints specific to CD players.

In the above-described embodiment, the periodical signal included in reproduced signals from the disk is the sub-code synchronizing signal. Alternatively, any other periodical signal such as a frame synchronizing signal may be utilized instead. Although the embodiment above is applied to the CD player 100 playing back the CD 1, this is not limitative of this invention. The invention is also applied advantageously to other disk drives capable of reproducing data from disks of different diameters.

The major benefits of the invention are summarized as follows: the invention, when embodied, determines the diameter of the currently loaded disk based on the intervals at which a periodical signal in the reproduced signals from the disk is detected just as the spindle motor is accelerated starting from the state in which the disk is rotating at a steady rotational speed. This allows the disk diameter to be determined in a short time. Upon reproduction of data from a CD, the time required from the time the playback key is pushed until the reproduced sound output is shortened. Because the servo gains of the spindle servo means are optimally set in accordance with the disk diameter determined, the spindle motor revolutions are controlled with the optimum gains relevant to the disk diameter in use. This provides a spindle motor operation at improved levels of responsiveness and stability. The absence of attachments such as optical sensors to detect the disk diameter contributes to resolving various space-related problems and constraints specific to disk drives.

As many apparently different embodiments of this invention may be made without departing from the spirit and scope thereof, it is to be understood that the invention is not limited to the specific embodiments thereof except as defined in the appended claims.

What is claimed is:

1. A disk drive for reproducing data from one of a plurality of disks having different diameters, said disk drive comprising:

periodical signal detection means for detecting a periodical signal included in signals reproduced from the disk;

spindle servo means for controlling a spindle motor rotating the disk so that said periodical signal will appear at constant intervals in the signals reproduced from the disk;

acceleration means for positively accelerating said spindle motor for a predetermined time starting from a first point in time at which said periodical signal detection means detects said periodical signal appearing at substantially constant intervals in the signals reproduced from the disk rotated at a predetermined rotational speed;

time measurement means for measuring a time interval ranging from said first point in time to a second point in time at which said periodical signal detection means detects said periodical signal a second time; and disk diameter determination means for determining the diameter of the disk by comparing the time interval measured by said time measurement means with a reference time.

2. The disk drive of claim 1, further comprising:

servo gain setting means for setting servo gains of said spindle servo means based upon the determination performed by said disk diameter determination means.

3. The disk drive of claim 1, wherein the disk is a compact disk and said periodical signal is a sub-code synchronizing signal.

4. The disk drive of claim 1, wherein said reference time is set to be longer than a first timer value in effect when the rotating disk is a heaviest first disk of disks having first diameters, and shorter than a second timer value in effect when the rotating disk is a lightest second disk of disks having second diameters larger than said first diameters.

5. The disk drive of claim 3, wherein said sub-code synchronizing signal includes data indicating a radial position on said compact disk, and said time measurement means measures the time interval at a predetermined position on said compact disk in accordance with said sub-code synchronizing signal.

6. The disk drive of claim 1, wherein said spindle servo means comprises:

a rough servo circuit which sets the spindle motor to a speed in a roughly precise range; and a phase lock servo circuit which sets the spindle motor to a speed approaching that of a reference clock signal.

7. The disk drive of claim 1, wherein said acceleration means accelerates said spindle motor with an acceleration pulse.

8. A disk drive for reproducing data from one of a plurality of disks having different diameters, said disk drive comprising:

periodical signal detection means for detecting a periodical signal included in signals reproduced from the disk;

spindle servo means for controlling a spindle motor rotating the disk so that said periodical signal will appear at constant intervals in the signals reproduced from the disk;

acceleration means for accelerating said spindle motor with an acceleration pulse for a predetermined time starting from a first point in time at which said periodical signal detection means detects said periodical signal appearing at substantially constant intervals in the signals reproduced from the disk rotated at a predetermined rotational speed;

time measurement means for measuring a time interval ranging from said first point in time to a second point in time at which said periodical signal detection means detects said periodical signal a second time; and disk diameter determination means for determining the diameter of the disk by comparing the time interval measured by said time measurement means with a reference time.

9. The disk drive of claim 8, further comprising:

servo gain setting means for setting servo gains of said spindle servo means based upon the determination performed by said disk diameter determination means.

10. The disk drive of claim 8, wherein the disk is a compact disk and said periodical signal is a sub-code synchronizing signal.

11. The disk drive of claim 8, wherein said reference time is set to be longer than a first timer value in effect when the rotating disk is a heaviest first disk of disks having first diameters, and shorter than a second timer value in effect when the rotating disk is a lightest second disk of disks having second diameters larger than said first diameters.

12. The disk drive of claim 10, wherein said sub-code synchronizing signal includes data indicating a radial position on said compact disk, and said time measurement means measures the time interval at a predetermined position on said compact disk in accordance with said sub-code synchronizing signal.

13. The disk drive of claim 8, wherein said spindle servo means comprises:

a rough servo circuit which sets the spindle motor to a speed in a roughly precise range; and a phase lock servo circuit which sets the spindle motor to a speed approaching that of a reference clock signal.

* * * * *